United States Patent
Amarilio et al.

(10) Patent No.: US 9,934,178 B2
(45) Date of Patent: Apr. 3, 2018

(54) FULL BANDWIDTH COMMUNICATION BUSES

(71) Applicant: QUALCOMM Incorporated, San Diego, CA (US)

(72) Inventors: Lior Amarilio, Yokneam (IL); Boaz Moskovich, Haifa (IL); Michael Zilbershtein, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 128 days.

(21) Appl. No.: 15/059,009

(22) Filed: Mar. 2, 2016

(65) Prior Publication Data
US 2016/0259743 A1   Sep. 8, 2016

Related U.S. Application Data

(60) Provisional application No. 62/128,170, filed on Mar. 4, 2015.

(51) Int. Cl.
*G06F 13/36* (2006.01)
*G06F 13/42* (2006.01)
*H04L 12/911* (2013.01)

(52) U.S. Cl.
CPC .......... *G06F 13/36* (2013.01); *G06F 13/4282* (2013.01); *G06F 13/4291* (2013.01); *H04L 47/72* (2013.01); *Y02B 60/1228* (2013.01); *Y02B 60/1235* (2013.01)

(58) Field of Classification Search
CPC ..... H04L 47/72; G06F 13/36; G06F 13/4282; G06F 13/4291
See application file for complete search history.

(56) References Cited

FOREIGN PATENT DOCUMENTS

| JP | 2013077893 A | 4/2013 |
|---|---|---|
| WO | 2012142335 A1 | 10/2012 |

OTHER PUBLICATIONS

Backman Juha et al., "SLIMbus™: An Audio, Data and Control Interface for Mobile Devices," AES 29th International Conference, Sep. 2-4, 2006, Seoul, Korea, AES, 10 pages.
International Search Report and Written Opinion for PCT/US2016/020558, dated Jun. 6, 2016, 12 pages.
Second Written Opinion for PCT/US2016/020558, dated Mar. 7, 2017, 7 pages.

(Continued)

*Primary Examiner* — Ernest Unelus
(74) *Attorney, Agent, or Firm* — Withrow & Terranova, PLLC (57) ABSTRACT

Full bandwidth communication buses are disclosed. While primarily focused on the Serial Low-power Inter-chip Media Bus (SLIMbus) communication bus, the concepts of the present disclosure may be extended to other communication buses. Exemplary aspects of the present disclosure utilize a reserved segment distribution code and a segment length to define a Segment Interval that is better-sized relative to raw data bits. By fitting the segment interval to the size of the raw data bits, bandwidth utilization is maximized, resulting in faster effective data transfers. Completion of such efficient data transfers may allow the communication bus to spend more time in a low-power mode and thus, conserve power. Additionally, such efficient data transfers may allow for better quality in presentation of multimedia content to the user.

22 Claims, 8 Drawing Sheets

(56) References Cited

OTHER PUBLICATIONS

Author Unknown, "SLIMbus," Wikipedia, The Free Encyclopedia, last modified: Feb. 19, 2013, retrieved from https://en.wikipedia.org/w/index.php?title=SLIMbus&oldid=539008572, 10 pages.
Boyce, Kenneth, "An Introduction to the Mobile Industry Processor Interface (MIPI) Alliance Standard Serial Low-power Inter-chip Media Bus (SLIMbus™)," MIPI Alliance, Inc., Jun. 5, 2010, pp. 1-20.
International Preliminary Report on Patentability for PCT/US2016/020558, dated Jun. 7, 2017, 16 pages.
Author Unknown, "DRAFT Specification for Serial Low-power Inter-chip Media Bus (SLIMbus®)," MIPI Alliance, Version 1.3, Revision 06, Feb. 14, 2015, 256 pages.

| Segment Interval (Slots) | Channel Rate Multiplier (Segments per Superframe) | Segment Distribution Code SD[11:0] | Notes |
|---|---|---|---|
| 1536 | 1 | $S_{10}S_9 1S_8 S_7 S_6 S_5 S_4 S_3 S_2 S_1 S_0$ | |
| 768 | 2 | $S_9 S_8 01 S_7 S_6 S_5 S_4 S_3 S_2 S_1 S_0$ | |
| 384 | 4 | $S_8 S_7 001 S_6 S_5 S_4 S_3 S_2 S_1 S_0$ | |
| 192 | 8 | $S_7 S_6 0001 S_5 S_4 S_3 S_2 S_1 S_0$ | |
| 96 | 16 | $S_6 S_5 00001 S_4 S_3 S_2 S_1 S_0$ | |
| 48 | 32 | $S_5 S_4 000001 S_3 S_2 S_1 S_0$ | |
| 24 | 64 | $S_4 S_3 0000001 S_2 S_1 S_0$ | |
| 12 | 128 | $S_3 S_2 00000001 S_1 S_0$ | |
| 6 | 256 | $S_2 S_1 000000001 S_0$ | |
| 3 | 512 | $S_1 S_0 0000000001$ | |
| 512 | 3 | $111 S_8 S_7 S_6 S_5 S_4 S_3 S_2 S_1 S_0$ | |
| 256 | 6 | $1101 S_7 S_6 S_5 S_4 S_3 S_2 S_1 S_0$ | |
| 128 | 12 | $11001 S_6 S_5 S_4 S_3 S_2 S_1 S_0$ | |
| 64 | 24 | $110001 S_5 S_4 S_3 S_2 S_1 S_0$ | |
| 32 | 48 | $1100001 S_4 S_3 S_2 S_1 S_0$ | |
| 16 | 96 | $11000001 S_3 S_2 S_1 S_0$ | |
| 8 | 192 | $110000001 S_2 S_1 S_0$ | |
| 4 | 384 | $1100000001 S_1 S_0$ | |
| 2 | 768 | $11000000001 S_0$ | |
| SL | See Table 150 (Figure 5) | 110000000001 | $S_0$ cannot be zero |
| Reserved | Reserved | 110000000000 | |
| Reserved | Reserved | 100000000000 | |
| Reserved | Reserved | 010000000000 | |
| ∞ | 0 | 000000000000 | SO = modulus (1536, SL) |

FIG. 4

| Segment Interval (SI) | Raw Data Bits | Segments per Superframe | Segment Offset (SO) |
|---|---|---|---|
| 2 | 4 | 768 | 0 |
| 3 | 8 | 512 | 0 |
| 4 | 12 | 384 | 0 |
| 5 | 16 | 307 | 1 |
| 6 | 20 | 256 | 0 |
| 7 | 24 | 219 | 3 |
| 8 | 28 | 192 | 0 |
| 9 | 32 | 170 | 6 |
| 10 | 36 | 153 | 6 |
| 11 | 40 | 139 | 7 |
| 12 | 44 | 128 | 0 |
| 13 | 48 | 118 | 2 |
| 14 | 52 | 109 | 10 |
| 15 | 56 | 102 | 6 |
| 16 | 60 | 96 | 0 |
| 17 | 64 | 90 | 6 |
| 18 | 68 | 85 | 6 |
| 19 | 72 | 80 | 16 |
| 20 | 76 | 76 | 16 |
| 21 | 80 | 73 | 3 |
| 22 | 84 | 69 | 18 |
| 23 | 88 | 66 | 18 |
| 24 | 92 | 64 | 0 |
| 25 | 96 | 61 | 11 |
| 26 | 100 | 59 | 2 |
| 27 | 104 | 56 | 24 |
| 28 | 108 | 54 | 24 |
| 29 | 112 | 52 | 28 |
| 30 | 116 | 51 | 6 |
| 31 | 120 | 49 | 17 |
| 32 | 124 | 48 | 0 |
| 33 | 128 | 46 | 18 |

FULL BANDWIDTH COMMUNICATION BUSES

PRIORITY APPLICATION

The present application claims priority to U.S. Provisional Patent Application Ser. No. 62/128,170, filed on Mar. 4, 2015, and entitled "FULL BANDWIDTH COMMUNICATION BUSES," which is incorporated herein by reference in its entirety.

BACKGROUND

I. Field of the Disclosure

The technology of the disclosure relates generally to a Serial Low-power Inter-chip Media Bus (SLIMbus™) communication bus.

II. Background

Mobile computing devices, such as cellular telephones, smart phones, and the like, have become increasingly common throughout modern society. The increase in use of such devices is attributable in part to the increased functionality of such devices. In particular, many such devices now support various multimedia inputs and outputs to expand the capability of the devices to produce a variety of multimedia content for the user. To facilitate operation of these various multimedia inputs and outputs, the mobile computing device may have a communication bus that carries data between the multimedia components.

One such communication bus is a Serial Low-power Inter-chip Media Bus (SLIMbus™) published by the MIPI® Alliance. The current version of the SLIMbus specification is version 1.3, revision 6, published Feb. 14, 2015, which is hereby incorporated by reference in its entirety. SLIMbus is implemented as a synchronous two-wire, configurable time division multiplexed (TDM) frame structure, and in particular, supports many digital audio components simultaneously. The two wires are configured to be a data line (DATA) and a clock line (CLOCK). Multiple components may be interconnected in a multi-drop bus topology. The SLIMbus specification defines cells, slots, subframes, frames, and superframes to further elaborate on the frame structure. Some slots are allocated to "control space," and all remaining slots are considered data space.

Within the data space, an active Manager can organize the slots into data channels. A data channel is a stream of one or more contiguous data slots (segments) and is dynamically created by the active Manager on the SLIMbus. The number of slots in a segment is referred to as the Segment Length and can be between one and thirty-one slots. The interval at which the segment repeats is known as the Segment Interval. Currently, the SLIMbus specification supports a limited number of predefined Segment Interval values as set forth in Table 20 of the SLIMbus specification. However, the predefined values do not cover full bandwidth cases when frame (or superframe) size divided by the chosen Segment Interval does not exactly equal a Segment Length (i.e., there is a remainder). As a result, some amount of the bandwidth of the bus is wasted using intervals that are not sized to fit the amount of raw data bits. This waste is exacerbated in bulk data transfers.

SUMMARY OF THE DISCLOSURE

Aspects disclosed in the detailed description include full bandwidth communication buses, related systems, and methods. While primarily focused on the Serial Low-power Inter-chip Media Bus (SLIMbus™), the concepts of the present disclosure may be extended to other communication buses. Exemplary aspects of the present disclosure utilize a reserved Segment Distribution code and a Segment Length to define a Segment Interval that is better-sized relative to raw data bits. By fitting the Segment Interval to the size of the raw data bits, bandwidth utilization is maximized, resulting in faster effective data transfers. Completion of such efficient data transfers may allow the communication bus to spend more time in a low-power mode and thus, conserve power. Additionally, such efficient data transfers may allow for better quality in presentation of multimedia content to the user.

In this regard in one aspect, a method of transmitting data across a communication bus is disclosed. The method includes determining a segment length based on expected raw data bits. The method also includes setting a segment interval equal to the segment length. The method also includes sending the segment length and line number to a component over a communication bus using a reserved code. The method also includes sending data to the component over the communication bus using the segment interval.

In another aspect, a device is disclosed. The device includes a bus interface configured to couple to a communication bus. The device also includes a memory. The device also includes a control system operably coupled to the memory and the bus interface. The control system is configured to determine a segment length based on expected raw data bits. The control system is also configured to set a segment interval equal to the segment length. The control system is also configured to send the segment length and line number to a component over the communication bus through the bus interface using a reserved code. The control system is also configured to send data to the component over the communication bus using the segment interval.

DETAILED DESCRIPTION

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include full bandwidth communication buses, related systems, and methods. While primarily focused on the Serial Low-power Inter-chip Media Bus (SLIMbus), the concepts of the present disclosure may be extended to other communication buses. Exemplary aspects of the present disclosure utilize a reserved Segment Distribution code and a Segment Length to define a Segment Interval that is better-sized relative to raw data bits. By fitting the Segment Interval to the size of the raw data bits, bandwidth utilization is maximized, resulting in faster effective data transfers. Completion of such efficient data transfers may allow the communication bus to spend more time in a low-power mode and thus, conserve power. Additionally, such efficient data transfers may allow for better quality in presentation of multimedia content to the user.

Before addressing exemplary aspects of the present disclosure, an overview of a communication bus that may benefit from the present disclosure is provided. In particular, FIGS. 1A-1C disclose exemplary systems with SLIMbus communication buses. After an introduction of the systems that have the SLIMbus communication buses is provided, an overview of the signaling structure is provided. Against this background, exemplary aspects of the present disclosure are provided beginning with reference to FIG. 2.

Figure 1A:
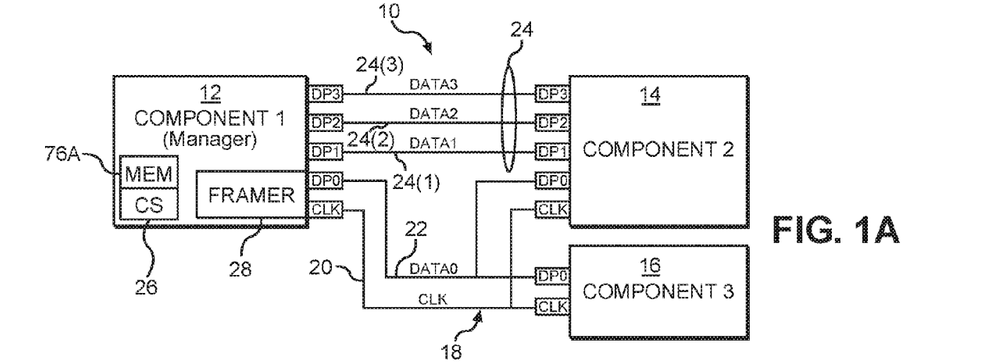
FIGS. 1A-1C are block diagrams of exemplary system topologies for a communication bus supporting exemplary aspects of the present disclosure.

In this regard, FIG. 1A illustrates a first system 10 having three components 12, 14, and 16 coupled to one another by a SLIMbus communication bus 18. The component 12 is a Manager component, and the components 14 and 16 are device components, such as speakers or microphones. The SLIMbus communication bus 18 includes a clock line 20 (also referred to as CLK in the drawings) and a data line 22 terminated by data pins DP0. Additional secondary data lines 24(1)-24(3) (also terminated by respective data pins DP1-DP3) also extend between the component 12 and the component 14. The component 12, being the Manager component, may include a control system 26 (also referred to as CS in the drawings) and a framer 28. The control system 26 may be associated with memory 26A (also referred to as MEM in the drawings) in which a look-up table containing Segment Distributions are stored as explained in greater detail below.

Figure 1B:
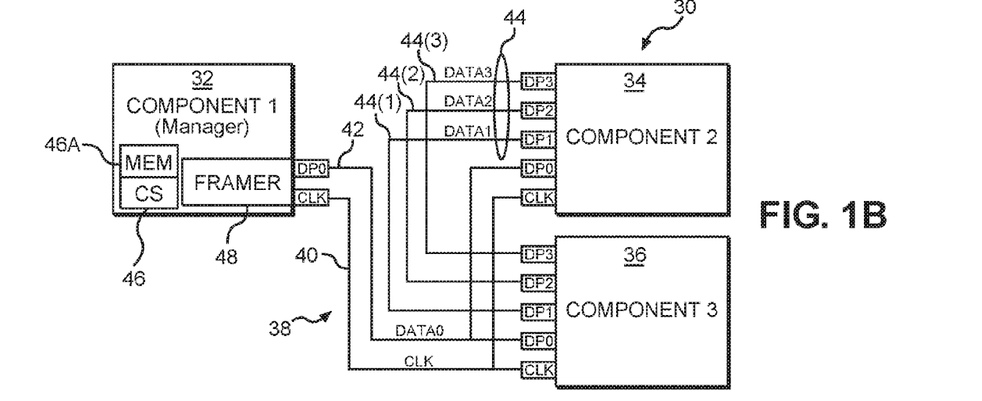

In similar fashion, FIG. 1B illustrates a system 30 having components 32, 34, and 36 coupled by a SLIMbus communication bus 38. The component 32 is a Manager component, and the components 34 and 36 are device components, such as speakers or microphones. The SLIMbus communication bus 38 includes a clock line 40 and a data line 42. Additional secondary data lines 44(1)-44(3) also extend between the component 34 and the component 36. The component 32, being the Manager component, may include a control system 46 and a framer 48. The control system 46 may be associated with memory 46A in which a look-up table containing Segment Distributions are stored as explained in greater detail below.

Figure 1C:
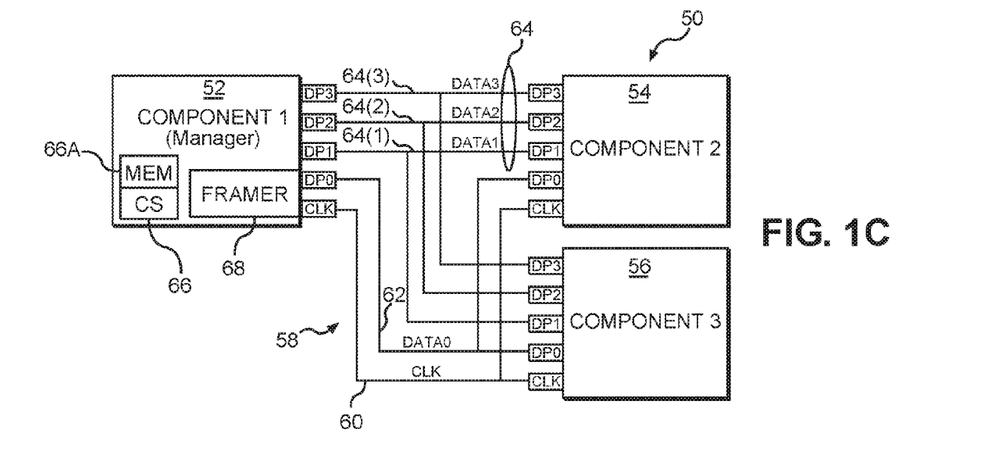

In similar fashion, FIG. 1C illustrates a system 50 having components 52, 54, and 56 coupled by a SLIMbus communication bus 58. The component 52 is a Manager component, and the components 54 and 56 are device components, such as speakers or microphones. The SLIMbus communication bus 58 includes a clock line 60 and a data line 62. Additional secondary data lines 64(1)-64(3) also extend between the component 52 and the components 54 and 56. The component 52, being the Manager component, may include a control system 66 and a framer 68. The control system 66 may be associated with a memory 66A in which a look-up table containing Segment Distributions are stored as explained in greater detail below.

Note that while only three secondary data lines are shown in each of FIGS. 1A-1C, the SLIMbus specification is not so limited. The SLIMbus specification contemplates from zero secondary data lines up to seven additional secondary data lines. Aspects of the present disclosure may be used with any number of secondary data lines.

To further assist in understanding exemplary aspects of the present disclosure, an overview of SLIMbus terminology (such as Segment Distributions) is provided. For a full explanation, the interested reader is directed to the previously-incorporated SLIMbus specification. In this regard, the SLIMbus specification defines five basic building blocks, namely, cells, slots, frames, subframes, and superframes. A cell is defined as a region of a DATA signal bounded by two consecutive positive edges of a CLOCK signal. A cell holds a single bit of information. A slot is defined as four contiguous cells. It is at the slot level that that the SLIMbus DATA signal is time division multiplexed between different channels. A frame is defined as one hundred ninety-two contiguous slots (i.e., 768 cells). A subframe is defined as the division of the frame structure at which the control space (i.e., slot S0 of the frame) and the data space are interleaved. Per the SLIMbus specification, the subframe length is programmable to six, eight, twenty-four, or thirty-two contiguous slots. A superframe is defined as eight contiguous frames (i.e., 1536 slots). The duration of a superframe is fixed in terms of slots, but not in terms of time. The rate of the superframe can be dynamically changed to suit the particular application by changing the root frequency, clock gear, or both. The DATA signal may be arranged into the control space and the data space. Slots not explicitly allocated to the control space are considered the data space. Note that channels sent on the secondary data lines (e.g., DATA1-DATA3) do not have the control space, and the entire frame is considered the data space.

The active Manager component (e.g., software on the component 12, 32, or 52) is responsible for bus configuration and device management. Although multiple components on a single SLIMbus may include Managers, only a single Manager may be "active" at any one time. The active Manager can organize the slots of the data space into data channels to transport application-specific data streams between devices on the communication bus (e.g., the SLIMbus communication bus 18, 38, or 58). A data channel is a stream of one or more contiguous slots that repeats at a fixed interval and is defined by four parameters, namely, the data line to which it belongs (e.g., DATA0), Segment Interval, Segment Offset, and Segment Length, as better explained below. The largest possible group of contiguous slots within a data channel is known as a segment. The interval that the segment repeats is known as the Segment Interval (sometimes abbreviated SI). The distance, in slots, of the first slot of the segment from the first slot (slot 0) of the superframe is known as the Segment Offset (sometimes abbreviated SO).

Together the Segment Interval and the Segment Offset of a data channel are referred to as its Segment Distribution (sometimes abbreviated SD) and are coded as shown in Table 20 of the SLIMbus specification. It should be appreciated that Table 20 of the SLIMbus specification defines Segment Intervals of: 2, 3, 4, 6, 8, 12, 16, 24, 32, 48, 64, 96, 128, 192, 256, 384, 512, 768, and 1536. The active Manager (i.e., the component 12, 32, or 52) may store Table 20 as a first look-up table in the associated memory (i.e., the memory 26A, 46A, or 66A) of the control system (i.e., the control system 26, 46, or 66). While specifically contemplated as a look-up table, Table 20 may be encoded in other formats as needed or desired.

The coding of the SD is used by a NEXT_DEFINE_CHANNEL message as set forth in Section 11.4.9 of the SLIMbus specification. In particular, the NEXT_DEFINE_CHANNEL message is used by the active Manager (e.g., the component 12, 32, or 52) to inform the devices on the communication bus that the active Manager intends to define parameters of a data channel. The NEXT_DEFINE_CHANNEL message includes the variables: CN (Channel Number), TP (Transport Protocol), SD (Segment Distribution), SL (Segment Length), and LN (Lane Number). As is discussed above, the predefined SDs within Table 20 do not cover every possible Segment Interval. Because not every Segment Interval is included in Table 20, when the superframe is divided by the Segment Length, some of the more common raw data bit lengths are not covered. When using push, pull, or asynchronous protocols, the assigned Segment Length is longer than the raw data bit length, and the additional slots are used as a TAG field or auxiliary slots within that segment. Such unused slots result in Segment Length multiples which do not fit into a single superframe. Such loss of overall bandwidth negatively impacts performance and may result in excessive power consumption, particularly for bulk data transfers.

Exemplary aspects of the present disclosure take a reserved Segment Distribution code from Table 20 of the SLIMbus specification and use it to define additional Segment Intervals. By providing the additional Segment Intervals, the Segment Interval may be selected that most closely corresponds to the raw data bit length resulting in less wasted bandwidth and improved performance.

Figure 2:
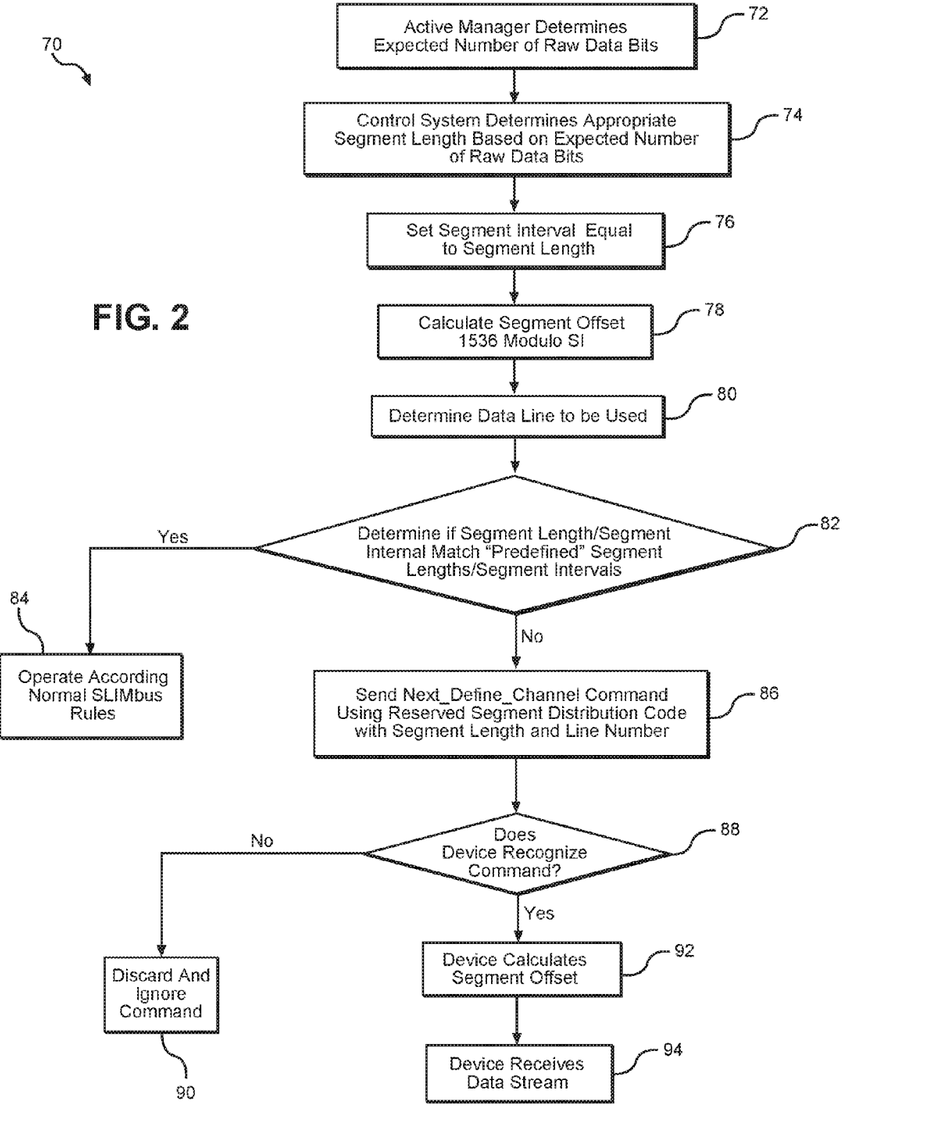
FIG. 2 is a flowchart illustrating a process associated with providing a full bandwidth communication bus.

In this regard, FIG. 2 illustrates an exemplary process 70 associated with providing a full bandwidth communication bus according to an exemplary aspect of the present disclosure. Thus, the process 70 begins with the active Manager (e.g., the software on the component 12, 32, or 52) determining an expected number of raw data bits (block 72). In an exemplary aspect, the software of the active Manager may determine the expected number of raw data bits by evaluating a data file that is being played and determining how many data bits will be sent to speaker components. Other exemplary aspects include data to and from an audio codec or any transaction between two devices on the system that needs higher bandwidth. Based on the expected number of raw data bits, the control system (e.g., the control system 26, 46, or 66) determines an appropriate Segment Length (block 74). The control system then sets the Segment Interval equal to the Segment Length (block 76) and calculates the Segment Offset by performing a calculation of 1536 modulo Segment Interval (1536% SI) (block 78). It should be appreciated that 1536 is the size of a superframe. If the size of the superframe is different in later versions of the SLIMbus specification, this value may be changed accordingly. Likewise, if aspects of the present disclosure are used with non-SLIMbus protocols, then this value may likewise conform to the appropriate value of such non-SLIMbus protocols. There may be multiple ways to calculate the Segment Offset at block 78. In a first aspect, an actual calculation is performed. In a second aspect, a look-up table is consulted and the Segment Length is cross-referenced to a precalculated Segment Offset.

With continued reference to FIG. 2, the control system (e.g., the control system 26, 46, or 66) may further determine the data line to be used (block 80). That is, the control system determines on which of the data lines DATA0-DATA7 the data stream will be sent. This determination will be dictated at least in part on which data lines are present and in part of what other data is being transferred between what other components of the system.

With continued reference to FIG. 2, the control system (e.g., the control system 26, 46, or 66) may further determine if the Segment Length/Segment Interval (which are equal per block 76) matches a "predefined" Segment Length/Segment Interval (block 82). As used herein, matching a "predefined" Segment Length/Segment Interval means matching a Segment Interval defined in Table 20 of the SLIMbus specification (i.e., 2, 3, 4, 6, 8, 12, 16, 24, 32, 48, 64, 96, 128, 192, 256, 384, 512, 768, and 1536). Note that there may be various ways that the determination may be made. In a first aspect, the control system initially references a first look-up table corresponding to Table 20 of the SLIMbus specification. If the Segment Interval is found in the first look-up table, the control system concludes that the there is a match between the Segment Length and the "predefined" Segment Lengths. A second look-up table could then contain the information for those Segment Lengths which are not "predefined." In a second aspect, a flag may be set in a look-up table, where the flag indicates whether the Segment Length is "predefined" or not.

With continued reference to FIG. 2, if the answer to block 82 is yes, the Segment Length/Segment Interval matches a "predefined" Segment Interval, then the control system operates under normal SLIMbus rules (block 84) and uses the appropriate Segment Distribution code as defined in Table 20 of the SLIMbus specification. It should further be appreciated that the process 70 may exit block 82 to block 84 for other reasons. For example, a capability inquiry at an earlier point in time may reveal that the device is a legacy device not capable of supporting the other Segment Intervals and, accordingly, would have to operate using normal (or legacy) SLIMbus rules. Still another reason might be a global disable of this function or some other legacy code which requires operation under normal or legacy SLIMbus rules.

As an optional step, which is not illustrated, the control system may further determine if the Segment Interval is two (2) and whether the data stream will be sent over the data line DATA0. If the data stream will be sent over the data line DATA0, then the control system operates under normal SLIMbus rules. If however, the data stream will be sent over one of the secondary data lines, then aspects of the present disclosure may also be applied. The reason for this distinction is that the SLIMbus specification does not allow an offset of zero for the Segment Interval of two on the data line DATA0. This rule is in place to allow for the control space slots on the data line DATA0. However, the secondary data lines do not have control space, and thus can have an offset of zero. Thus, if the optional step determines that the Segment Interval is two and the data stream will be sent over a secondary data line, the process 70 may proceed to block 86.

With continued reference to FIG. 2, if the control system determines that the Segment Length/Segment Interval is not a predefined Segment Length/Segment Interval at block 82, then the process 70 continues, and the control system (e.g., the control system 26, 46, or 66) sends the NEXT_DEFINE_CHANNEL command with the reserved Segment Distribution code having the Segment Length and the Line Number as operands for the command (block 86). Note that the control system may effectuate sending this command through the framer (e.g., the framer 28, 48, or 68). It should be appreciated that at the time of writing, the SLIMbus specification defines four reserved Segment Distribution codes in Table 20. While exemplary aspects of the present disclosure contemplate using the first of the four reserved Segment Distribution codes, any of the four reserved Segment Distribution codes may be used without departing from the scope of the present disclosure. Further, as used herein, the concept of the reserved Segment Distribution code is relative to the previously-incorporated SLIMbus specification and not subsequent versions.

With continued reference to FIG. 2, the device to which the NEXT_DEFINE_CHANNEL command has been sent (e.g., the component 14, 16, 34, 36, 54, or 56) receives the command and attempts to process it. In particular, the device determines if the device recognizes the command (block 88). If the device is not programmed to recognize the reserved Segment Distribution code (i.e., the device does not recognize the command), the device discards and ignores the command (block 90) pursuant to the SLIMbus specification. An error may be sent to the active Manager indicating that the device has ignored the command and the active Manager may retry using normal or legacy SLIMbus rules (not illustrated). If, however, the device recognizes the reserved Segment Distribution code, then the device calculates the Segment Offset (block 92). This calculation may be done by direct calculation using the modulo operation (i.e., 1536 modulo Segment Length) or the device may refer to a look-up table to find the appropriate Segment Offset. The device then receives the data stream and operates accordingly (block 94).

Figure 3:
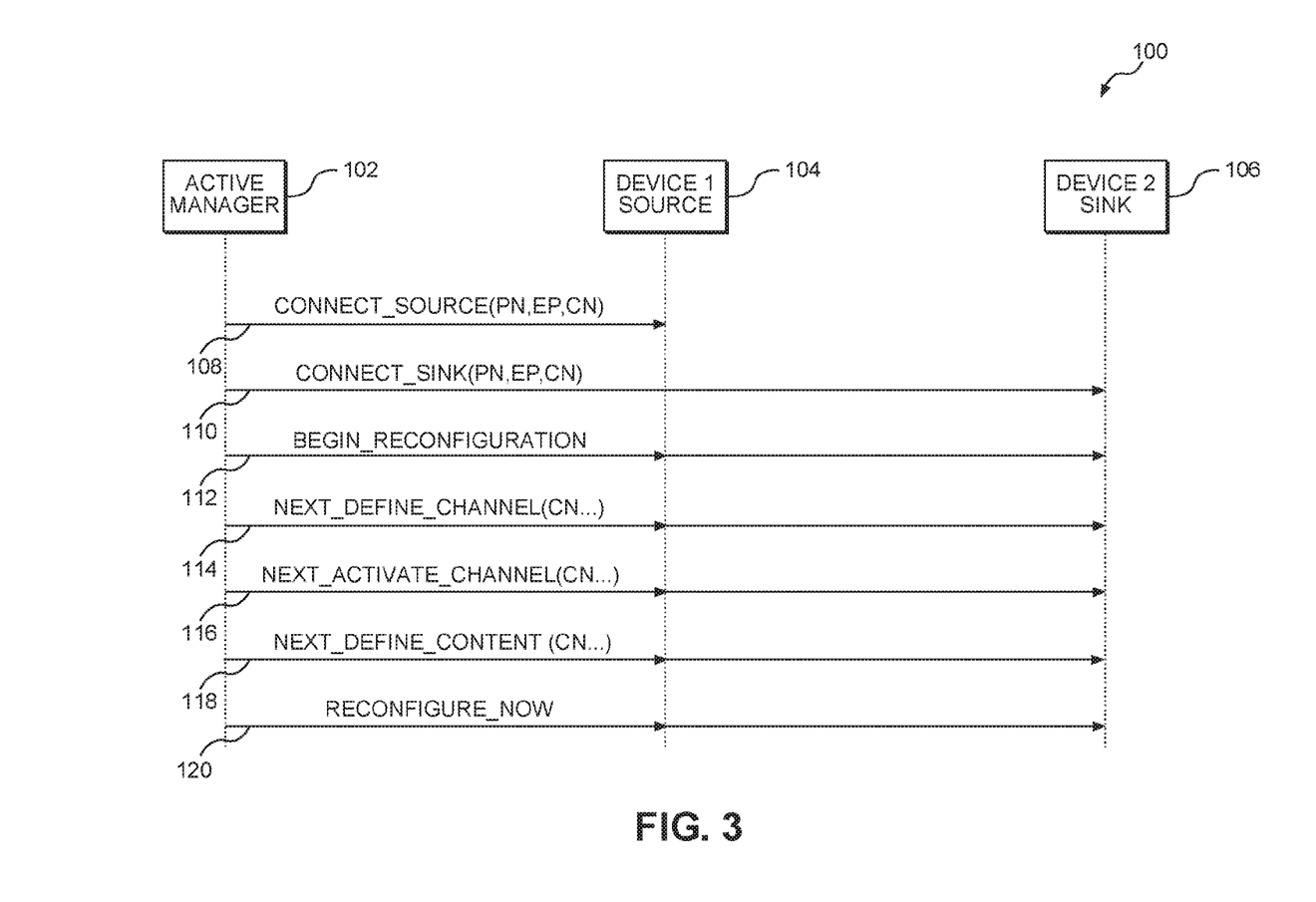
FIG. 3 is a message signal chart representing signals that may implement the full bandwidth communication bus of the present disclosure.

FIG. 3 is a message signal chart 100 representing signals that may implement the full bandwidth communication bus of the present disclosure according to the process 70 of FIG. 2. In the message signal chart 100, an active Manager 102 (which may be the component 12, 32, or 52), is coupled to devices 104 and 106 through a communication bus (not illustrated), which may be a SLIMbus (e.g., the SLIMbus communication bus 18, 38 or 58). As illustrated, the device 104 is an audio source and the device 106 is an audio sink. The active Manager 102 sends a CONNECT_SOURCE (PN, EP, CN) command (where PN is port number, EP is endpoint, and CN is channel number) to the device 104 (signal 108) and then sends a CONNECT_SINK (PN, EP, CN) command to the device 106 (signal 110). The active Manager 102 then sends a BEGIN_RECONFIGURATION command to the device 104 and the device 106 (signal 112). The active Manager 102 then sends a NEXT_DEFINE_CHANNEL (CN, TP, SD, SL, LN) command, where the SD is one of the four reserved Segment Distribution codes (signal 114). The active Manager 102 then sends a NEXT_ACTIVATE_CHANNEL command (signal 116) and a NEXT_DEFINE_CONTENT command (signal 118) and, finally a RECONFIGURE_NOW command (signal 120).

Figure 4:
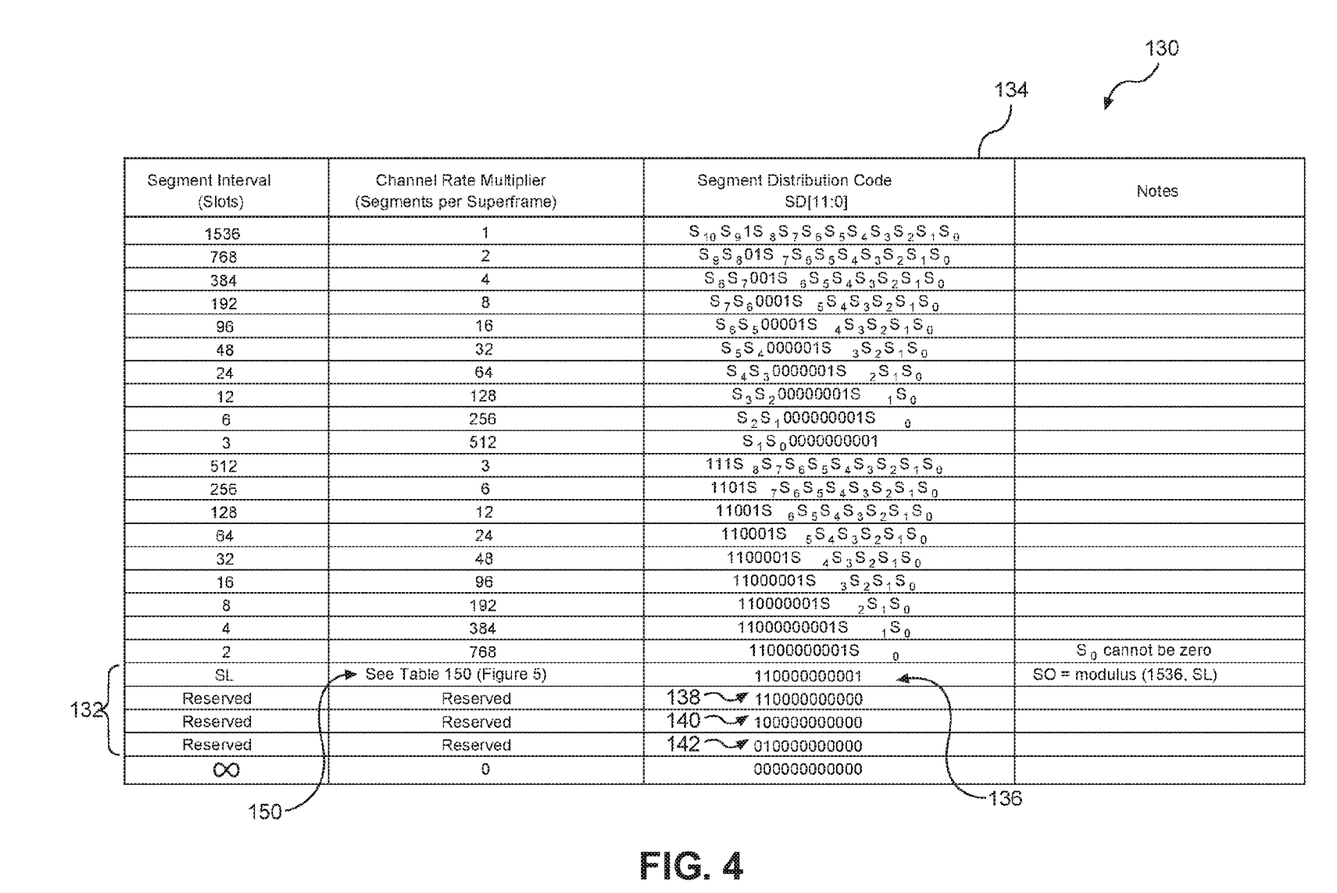
FIG. 4 is a table showing use of a reserved code to change a Segment Interval according to an exemplary aspect of the present disclosure.

FIG. 4 is a table 130 showing use of one of four reserved Segment Distribution codes 132 of available SD codes 134 to set the Segment Interval according to an exemplary aspect of the present disclosure. In particular, a first reserved code 136 is used to indicate to the device that the Segment Interval is to be set to the Segment Length as defined in table 150 (see FIG. 5). While the first reserved code 136 is specifically contemplated as illustrated, it should be appreciated that other reserved codes 138, 140, or 142 may be used instead. Note that the table 130 is substantially similar to Table 20 of the SLIMbus specification. Accordingly, the table 130 may include a note for the first reserved code 136 that the Segment Offset is defined to be the modulus of (1536, SL), where SL is the Segment Length. As noted above, while currently the superframe is 1536 slots, exemplary aspects of the present disclosure may operate on superframes of other sizes (e.g., the Segment Offset may be the modulus of (superframe size, SL)). As further noted above, the Segment Offset may be calculated at the device (e.g., the device 104 or 106) after receipt of the NEXT_DEFINE_CHANNEL command through a direction operation or by reference to a look-up table. Further note that when the NEXT_DEFINE_CHANNEL command is sent with the reserved Segment Distribution code from amongst the four reserved Segment Distribution codes, the Segment Length is the same as the Segment Interval and the device sets the SI to be the SL sent as part of the NEXT_DEFINE_CHANNEL command. In this manner, raw data bit values that are not supported by the conventional SLIMbus specification can be used.

Figure 5:
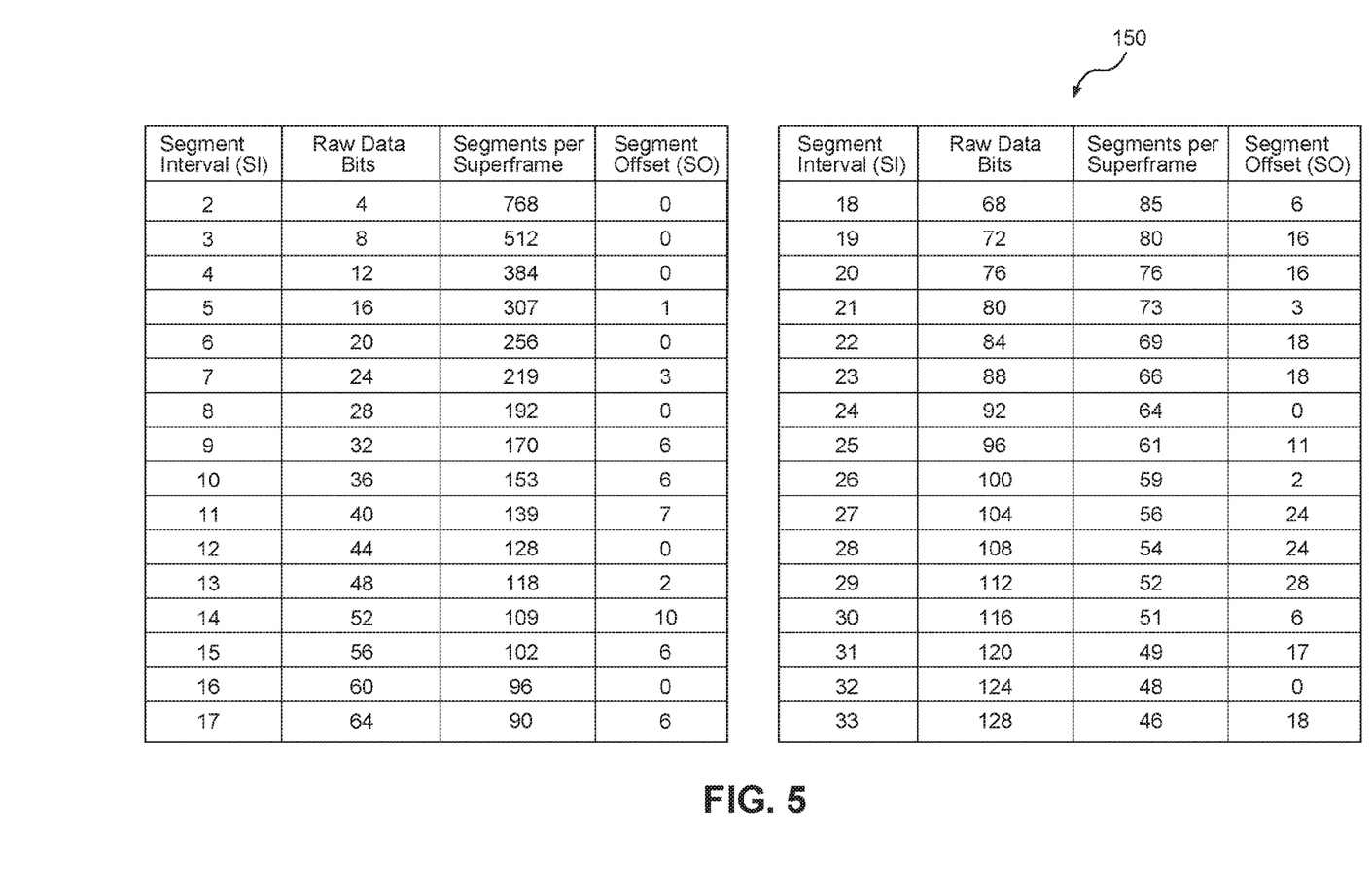
FIG. 5 is a table showing segments according to each Segment Interval according to exemplary aspects of the present disclosure.

In this regard, FIG. 5 is a table 150 showing segments according to each Segment Interval according to exemplary aspects of the present disclosure. Note that the Segment Interval may be between one and thirty-three. Accordingly, the Segment Length, which is equal to the Segment Interval, may also be between one and thirty-three. In particular, it should be noted that the most common raw data bits are 4, 8, 16, 24, 32, 48, and 64. Without the benefit of exemplary aspects of the present disclosure, the SLIMbus specification does not support 16, 24, 32, 48, or 64 raw data bits with the additional four bits in the TAG field. However, through the use of the reserved Segment Distribution code in the manner outlined above, the SI can be set to 5, 7, 9, 13, and 17, corresponding to 16, 24, 32, 48, and 64 raw data bits with the additional four bits in the TAG field, respectively.

Figure 6:
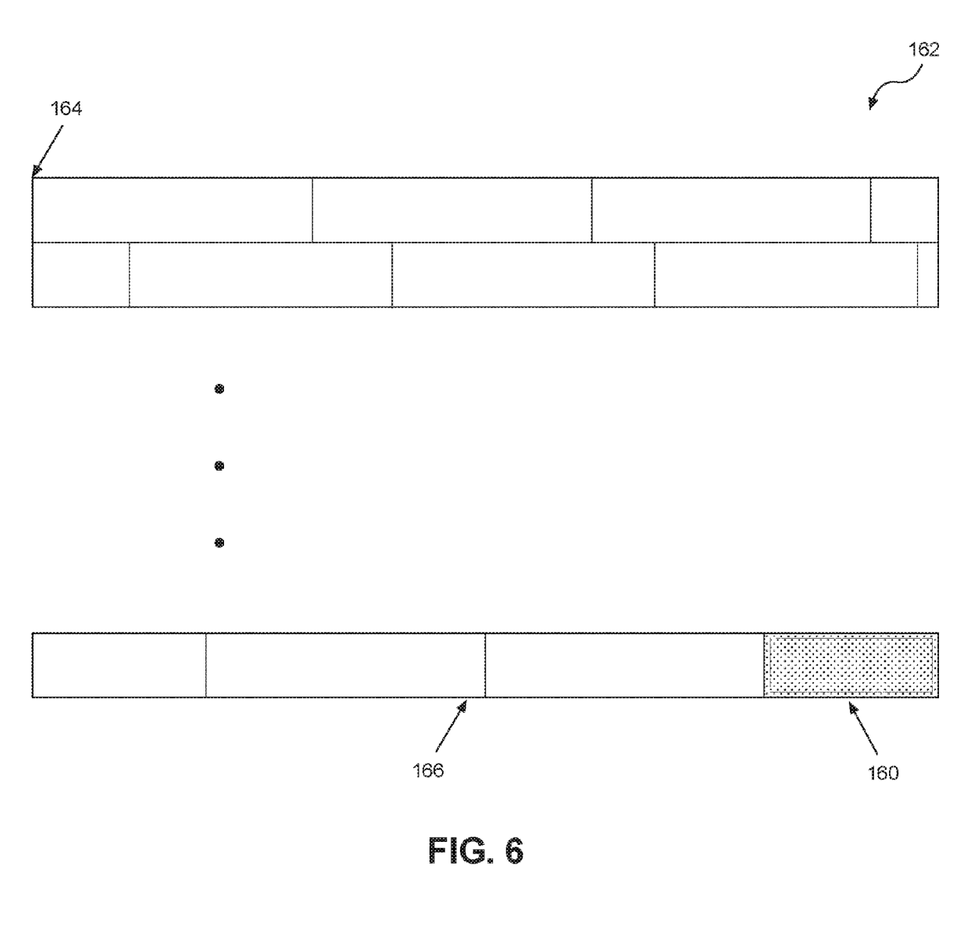
FIG. 6 is a simplified superframe having a Segment Offset equal to zero.

As noted above, data streams sent on the data line DATA0 include control space slots and thus, any data stream sent on the data line DATA0 must include a Segment Offset. While data streams sent on the data line DATA0 must still include an offset, data streams sent on the secondary data lines do not require an offset. Accordingly, exemplary aspects of the present disclosure allow for the Segment Offset to equal zero, even when the superframe is not evenly divisible by the Segment Length. Instead of putting the Segment Offset at the beginning, exemplary aspects of the present disclosure contemplate providing a residuum 160 within a superframe 162 as illustrated in FIG. 6. As is readily apparent, offset 164 at the beginning of the superframe 162 is zero, and the superframe 162 is filled with equally-sized data segments 166. If data remains to be sent that would add a segment such that the sum of the segments would exceed the size of the superframe 162, the additional data is not sent in the superframe 162 and is held for the next superframe (not illustrated). By pushing the offset 164 to the end of the superframe 162, the data at the beginning of the superframe 162 arrives at the destination faster than if the offset 164 was placed at the beginning of the superframe 162. By setting the Segment Offset to zero, the device offset calculation is simplified. A trade-off exists in that some additional complexity in the design is required so that the software of the active Manager can determine whether there are enough slots left in the frame for sending/receiving another segment.

Figure 7:
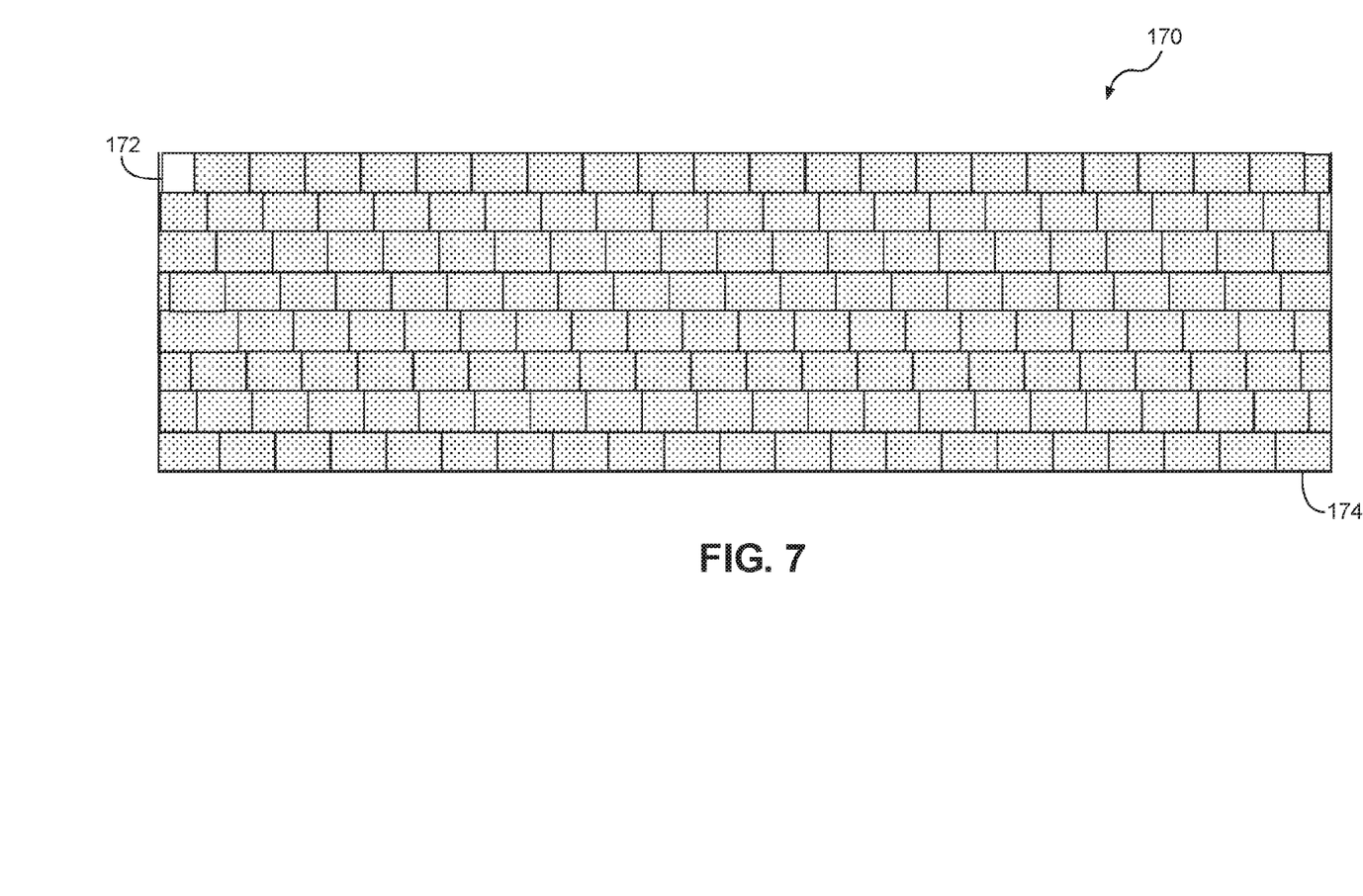
FIG. 7 is a simplified superframe having a Segment Offset that is not equal to zero.

Absent the variation illustrated in FIG. 6, the data is always aligned with the end of the superframe as illustrated in FIG. 7. In this regard, FIG. 7 provides a superframe 170, having a Segment Length of nine. As explained above, the Segment Interval is also nine. The Segment Offset 172 is 1536% 9, which equals six. The Segment Offset 172 is present at the beginning of the superframe 170 and the data is aligned at the end 174 of the superframe 170.

With the improved fit from the better-sized Segment Intervals, an improved bandwidth is achieved. For example, absent exemplary aspects of the present disclosure, the maximum raw bandwidth under the conventional SLIMbus specification for 16 raw data bits is 16.384 Mbps. In contrast, using exemplary aspects of the present disclosure allows that value to be improved to 19.684 Mbps. Likewise, the before/after for 24 raw data bits is 18.432/21.024 Mbps; for 32 raw data bits is 16.384/21.76 Mbps; for 48 raw data bits is 18.432/22.656; and for 64 raw data bits is 16.384/23.04 Mbps.

The full bandwidth communication buses for audio devices according to aspects disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 8:
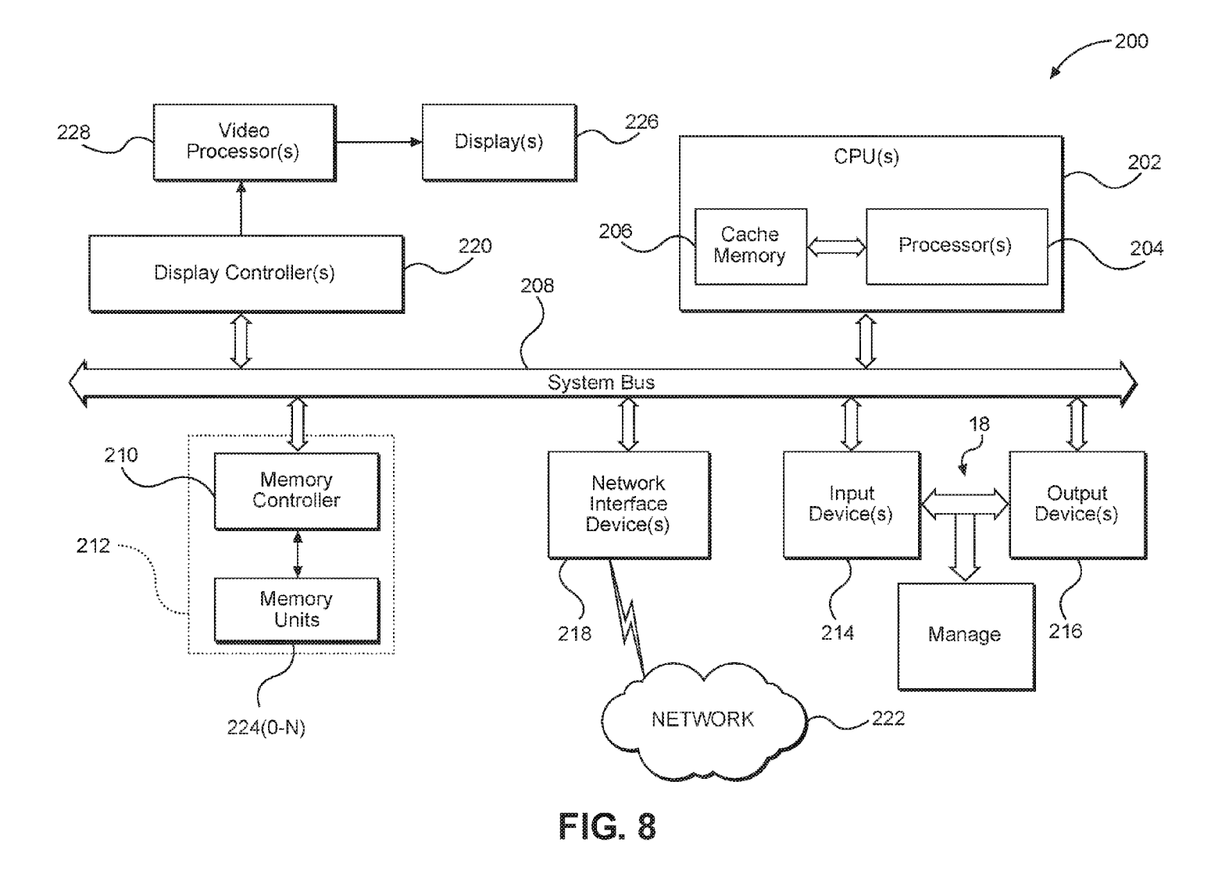
FIG. 8 is a block diagram of an exemplary processor-based system that can include a communication bus operating according to the present disclosure.

In this regard, FIG. 8 illustrates an example of a processor-based system 200 that can employ the full bandwidth SLIMbus communication buses 18, 38, and 58 (only 18 illustrated in FIG. 8) illustrated in FIGS. 1A-1C. In this example, the processor-based system 200 includes one or more central processing units (CPUs) 202, each including one or more processors 204. The CPU(s) 202 may have cache memory 206 coupled to the processor(s) 204 for rapid access to temporarily stored data. The CPU(s) 202 is coupled to a system bus 208 and can intercouple master and slave devices included in the processor-based system 200. As is well known, the CPU(s) 202 communicates with these other devices by exchanging address, control, and data information over the system bus 208. For example, the CPU(s) 202 can communicate bus transaction requests to a memory controller 210. Although not illustrated in FIG. 7, multiple system buses 208 could be provided.

Other devices can be connected to the system bus 208. As illustrated in FIG. 8, these devices can include a memory system 212, one or more input devices 214, one or more output devices 216, one or more network interface devices 218, and one or more display controllers 220, as examples. The input device(s) 214 can include any type of input device, including, but not limited to, input keys, switches, voice processors, etc. The output device(s) 216 can include any type of output device, including, but not limited to, audio, video, other visual indicators, etc. Note that the audio components of the input device(s) 214 and output device(s) 216 may be coupled by the SLIMbus communication bus 18 of the present disclosure. The network interface device(s) 218 can be any device configured to allow exchange of data to and from a network 222. The network 222 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 218 can be configured to support any type of communications protocol desired. The memory system 212 can include one or more memory units 224(0-N).

The CPU(s) 202 may also be configured to access the display controller(s) 220 over the system bus 208 to control information sent to one or more displays 226. The display controller(s) 220 sends information to the display(s) 226 to be displayed via one or more video processors 228, which process the information to be displayed into a format suitable for the display(s) 226. The display(s) 226 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method of transmitting data across a communication bus comprising one or more data lines, the method comprising:
   determining a segment length based on an expected number of raw data bits, wherein a segment is two or more data slots, the segment length of the segment is a number of data slots in the segment, a data slot is four contiguous cells, and a cell holds a single bit of information;
   setting a segment interval equal to the segment length, wherein the segment interval is an interval at which the segment repeats;
   calculating a segment offset based on the segment interval, wherein the segment offset is a distance, in slots of a first slot of the segment from a first slot of a superframe;
   sending the segment length and a data line number to a component over a communication bus using a reserved code; and
   sending data to the component over a data line of the communication bus corresponding to the data line number using the segment interval.

2. The method of claim 1, wherein sending the segment length and the data line number to the component over the communication bus comprises sending the segment length and the data line number to the component over a SLIMbus communication bus.

3. The method of claim 1, wherein determining the segment length comprises selecting the segment length between one and thirty-three slots.

4. The method of claim 1, wherein determining the segment length comprises selecting the segment length from among the group consisting of: five, seven, nine through eleven, thirteen through fifteen, seventeen through twenty-three, twenty-five through thirty-one and thirty-three.

5. The method of claim 1, wherein the superframe comprises 1536 contiguous slots.

6. The method of claim 5, wherein calculating the segment offset comprises using a look-up table.

7. The method of claim 5, wherein calculating the segment offset comprises performing a calculation of 1536% Segment Length, where % is the modulus operand.

8. The method of claim 1, further comprising determining if the segment interval matches a predefined segment interval.

9. The method of claim 8, wherein determining if the segment interval matches the predefined segment interval comprises detecting a flag in a look-up table.

10. The method of claim 8, wherein determining if the segment interval matches the predefined segment interval comprises comparing the segment interval to entries in a look-up table having predefined segment intervals and failing to find a match.

11. The method of claim 8, wherein determining if the segment interval matches the predefined segment interval comprises comparing the segment interval to entries in a look-up table having segment intervals that are not predefined and finding a match.

12. A device comprising:
   a bus interface configured to couple to a communication bus comprising one or more data lines;
   a memory; and
   a control system operably coupled to the memory and the bus interface, the control system configured to:
      determine a segment length based on an expected number of raw data bits, wherein a segment is two or more data slots, the segment length of the segment is a number of data slots in the segment, a data slot is four contiguous cells, and a cell holds a single bit of information;
      set a segment interval equal to the segment length, wherein the segment interval is an interval at which the segment repeats;
      calculate a segment offset based on the segment interval, wherein the segment offset is a distance, in slots of a first slot of the segment from a first slot of a superframe;
      send the segment length and a data line number to a component over the communication bus through the bus interface using a reserved code; and
      send data to the component over a data line of the communication bus corresponding to the data line number using the segment interval.

13. The device of claim 12, wherein the bus interface comprises a SLIMbus bus interface.

14. The device of claim 12, wherein the control system configured to determine the segment length is further configured to select the segment length between one and thirty-three slots.

15. The device of claim 12, wherein the control system configured to determine the segment length is further configured to select the segment length from among the group consisting of: five, seven, nine through eleven, thirteen through fifteen, seventeen through twenty-three, twenty-five through thirty-one and thirty-three.

16. The device of claim 12, wherein the superframe comprises 1536 contiguous slots.

17. The device of claim 16, wherein the control system configured to calculate the segment offset is further configured to use a look-up table stored in the memory.

18. The device of claim 16, wherein the control system configured to calculate the segment offset is further configured to perform a calculation of 1536% Segment Length, where % is the modulus operand.

19. The device of claim 12, wherein the control system is further configured to determine if the segment interval matches a predefined segment interval.

20. The device of claim 19, wherein the control system configured to determine if the segment interval matches the predefined segment interval is further configured to detect a flag in a look-up table.

21. The device of claim 19, wherein the control system configured to determine if the segment interval matches the predefined segment interval is further configured to compare the segment interval to entries in a look-up table having predefined segment intervals for a match.

22. The device of claim 19, wherein the control system configured to determine if the segment interval matches the predefined segment interval is further configured to compare the segment interval to entries in a look-up table having segment intervals that are not predefined for a match.

* * * * *